(12) United States Patent
Yehuda et al.

(10) Patent No.: US 7,376,898 B1
(45) Date of Patent: *May 20, 2008

(54) METHODS AND APPARATUS FOR MANAGING RESOURCES

(75) Inventors: Hanna Yehuda, Newton, MA (US); JoAnne B. Hubbard, Concord, MA (US); Francois Gauvin, Salem, MA (US); Elizabeth J. Phalen, Upton, MA (US); Alan R. Schell, Hopkinton, MA (US); Norris V Li, Newton, MA (US)

(73) Assignee: EMC Corporation, Hopkinton, MA (US)

(*) Notice: Subject to any disclaimer, the term of this patent is extended or adjusted under 35 U.S.C. 154(b) by 603 days.

This patent is subject to a terminal disclaimer.

(21) Appl. No.: 10/812,511

(22) Filed: Mar. 30, 2004

(51) Int. Cl.
*G06F 15/177* (2006.01)
*G06F 3/00* (2006.01)
*G06F 15/173* (2006.01)

(52) U.S. Cl. .................. 715/741; 715/734; 715/735; 715/736; 709/225

(58) Field of Classification Search ........ 715/734–736, 715/741, 738–739; 709/225
See application file for complete search history.

(56) References Cited

U.S. PATENT DOCUMENTS

| | | | | |
|---|---|---|---|---|
| 5,060,135 A | * | 10/1991 | Levine et al. | 715/769 |
| 5,999,179 A | * | 12/1999 | Kekic et al. | 715/734 |
| 6,009,466 A | * | 12/1999 | Axberg et al. | 709/220 |
| 6,295,419 B1 | * | 9/2001 | Kobayashi et al. | 396/379 |
| 6,640,278 B1 | * | 10/2003 | Nolan et al. | 711/6 |
| 6,785,728 B1 | * | 8/2004 | Schneider et al. | 709/229 |
| 6,839,746 B1 | * | 1/2005 | Muthiyan et al. | 709/220 |
| 7,171,624 B2 | * | 1/2007 | Baldwin et al. | 715/734 |
| 7,194,538 B1 | * | 3/2007 | Rabe et al. | 709/224 |
| 2001/0047463 A1 | * | 11/2001 | Kamano et al. | 711/163 |
| 2002/0075312 A1 | * | 6/2002 | Amadio et al. | 345/764 |
| 2002/0143942 A1 | * | 10/2002 | Li et al. | 709/225 |
| 2003/0085914 A1 | * | 5/2003 | Takaoka et al. | 345/734 |
| 2003/0093509 A1 | * | 5/2003 | Li et al. | 709/223 |
| 2003/0131108 A1 | * | 7/2003 | Kagami et al. | 709/226 |
| 2003/0145041 A1 | * | 7/2003 | Dunham et al. | 709/203 |
| 2003/0149752 A1 | * | 8/2003 | Baldwin et al. | 709/223 |
| 2003/0149769 A1 | * | 8/2003 | Axberg et al. | 709/225 |

(Continued)

OTHER PUBLICATIONS

Person, Ron, "Using the AutoFilter", Special Edition Using Microsoft Excel 97, Que, Dec. 17, 1996, pp. 1-7.*

*Primary Examiner*—Stephen Hong
*Assistant Examiner*—William Wong
(74) *Attorney, Agent, or Firm*—Barry W. Chapin, Esq.; Chapin IP Law, LLC

(57) ABSTRACT

A processing device receives a selection of at least one host resource associated with a storage area network as selected by a network manager. In addition to receiving the selection of the at least one host resource, the processing device receives a selection of at least one storage parameter associated with the storage area network. The selection of the at least one storage parameter includes a selection of a vendor type of a storage system resource of the storage area network. Based on the selection information, the network management application correlates the selection of the at least one host resource with the selection of the vendor type to identify: i) storage devices of the storage system resource corresponding to the at least one storage parameter, and ii) access control rights of the at least one host resource with respect to the storage devices.

43 Claims, 13 Drawing Sheets

U.S. PATENT DOCUMENTS

2003/0154281 A1* 8/2003 Mitsuoka et al. ........... 709/225
2003/0167327 A1* 9/2003 Baldwin et al. ............ 709/225
2004/0064704 A1* 4/2004 Rahman .................... 713/182
2005/0091353 A1* 4/2005 Gopisetty et al. .......... 709/223

* cited by examiner

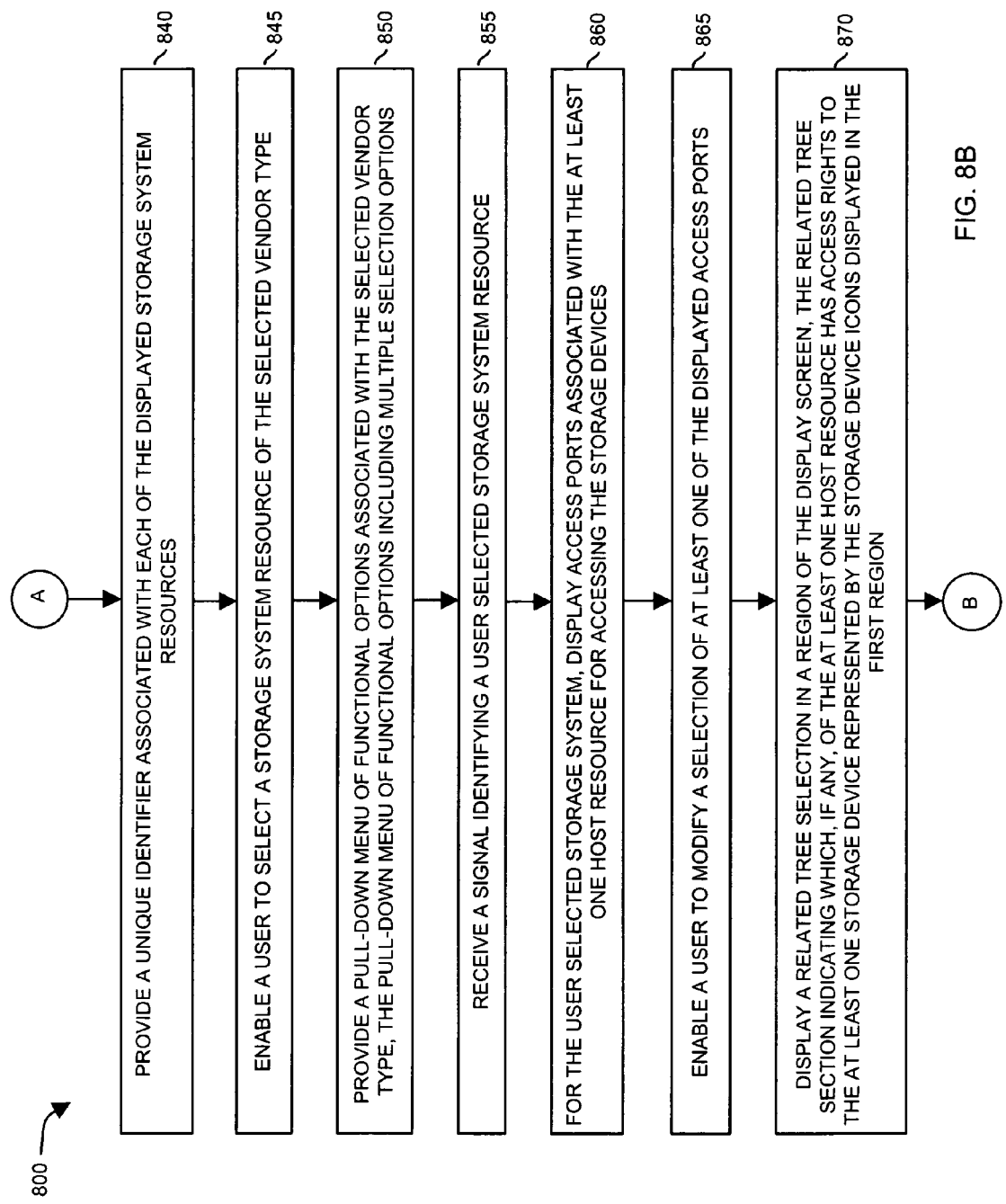

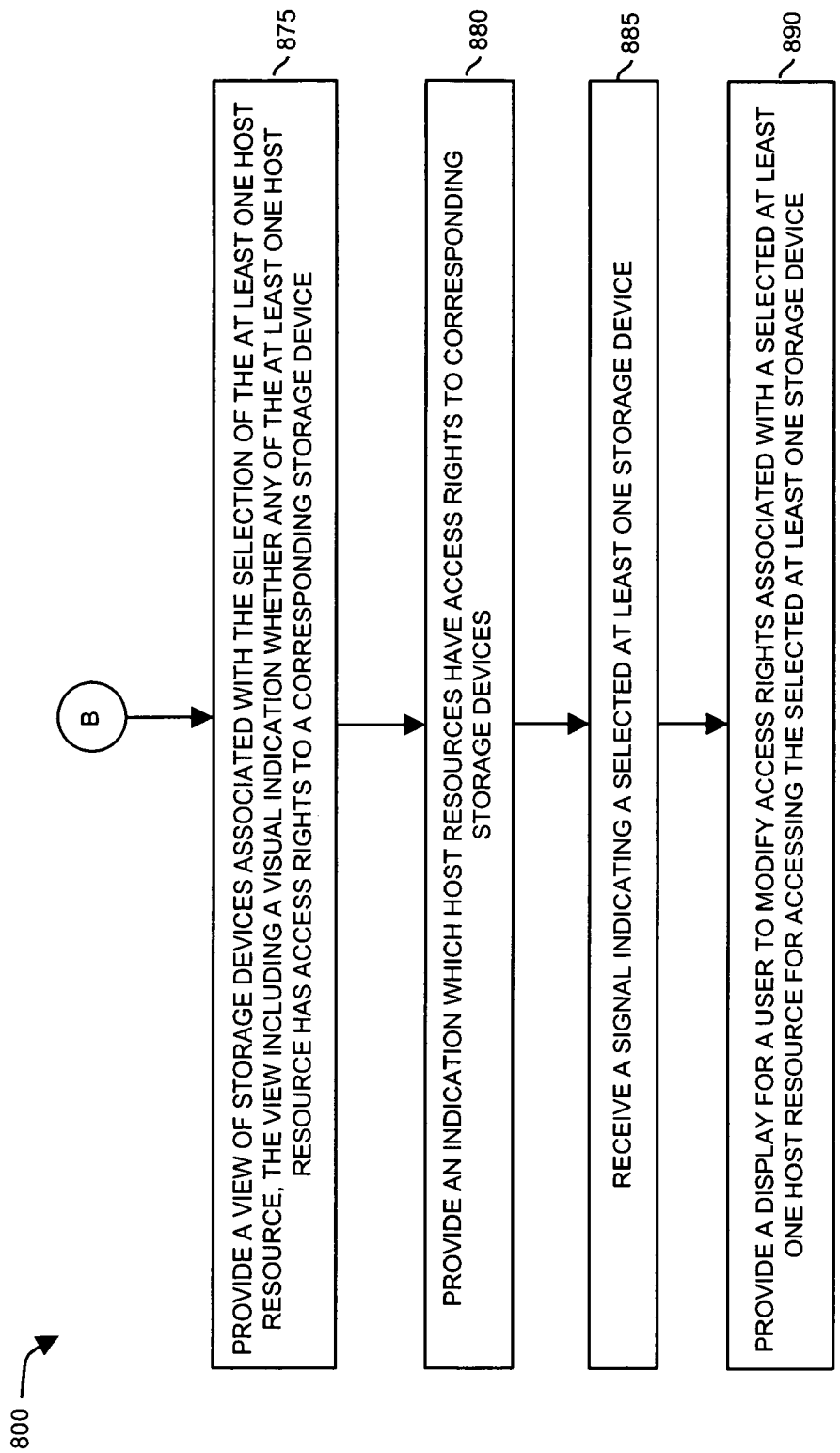

WWN Group Members - HP512-1 - HP XP 512

WWNGrp-X Members:

| Host Ports | WWN | Host | Connected to Port |
|---|---|---|---|
| HP-1 | 0162-9640-2864-9314 | Host-1 | CL-A1 |
| HP-2 | 0224-5363-5108-6182 | Host-1 | CL-A2 |
| HP-3 | 0935-6842-0128-4375 | Host-2 | CL-A1, CL-A2 |
| HP-4 | 2740-6541-8293-7546 | Host-3 | CL-A2 |
| HP-5 | 0478-5942-1624-3528 | Host-3 | CL-A2 |

Print  Preview  Export   OK  Cancel  Help

FIG. 11

METHODS AND APPARATUS FOR MANAGING RESOURCES

BACKGROUND

Certain conventional computer devices include software to generate Graphical User Interfaces (GUI) that enable network managers to graphically manage, control and configure various types of hardware and software resources associated with a corresponding managed storage area network. In one conventional application, a network management storage application renders a graphical user interface enabling a network manager to graphically select, interact with, and manage local or remote devices and associated software processes operating in a storage area network. More specifically, based on use of the graphical user interface in combination with an input device such as a hand operated mouse and corresponding pointer displayed on a viewing screen, a network manager is able to manage hardware and software entities such as file systems, databases, storage devices, network data communications devices, etc. associated with the storage area network. Typically, in such network management applications, the network manager selects a displayed icon representing a corresponding managed resource in the network and applies management commands to carry out intended management functions.

Conventional network management applications are designed to provide a network manager with information regarding access rights associated with clients in a network. For example, a network may include a number of hardware devices such as host computers, servers, data communications devices (e.g., switches, routers, etc.), network attached storage devices, proxy devices, firewall devices, and so forth that are coupled amongst each other via physical cables. A conventional management application typically provides access to a database of data structures describing and defining how these hardware resources are interconnected and, more specifically, which host computers are able to access which storage devices in a storage system. At any given time, the network manager can view and change access right information associated with the managed network resources via use of the network management application. Thus, the network manager has the ultimate power to grant and deny access rights to corresponding storage systems.

Over time, a managed storage system may grow to include network resources associated with different vendors. For example, a storage area network may grow (based on increased storage needs of the owner) to include storage systems manufactured by two or more vendors. Each vendor typically requires that its manufactured products communicate via use of a corresponding vendor specific protocol. For example, a Hitachi storage system typically requires use of Hitachi specific commands to control settings of the Hitachi storage device. Similarly, an IBM (International Business Machines) storage system requires use of IBM specific commands to control settings of the IBM storage device, and so on.

To manage storage system resources associated with multiple vendors according to conventional techniques, the network manager must utilize different network management software applications, one for each vendor type of storage system. Each of the network management software applications supports unique, vendor specific display information and views to manage settings of a corresponding type of vendor's storage system.

SUMMARY

Conventional network management software applications that support management of network resources such as host computers with respect to corresponding storage system resources suffer from a variety of deficiencies. For example, as mentioned, conventional storage management software applications typically support management of storage systems for only a single, specific vendor type. This complicates a job associated with management of a large storage area network such as one including that include storage systems manufactured by multiple vendors because the network manager must utilize different software applications to manage settings of different vendor types of storage systems in the storage area network.

For example, to adjust settings for each of multiple storage system vendor types, the network manager must be trained to use multiple types of vendor software applications. Even if a network manager is skilled at using the different network manager software applications, the network manager must open and execute different applications in order to modify access settings for two or more different types of storage systems. Executing two or more network manager software applications typically requires more time than utilizing a single application. Thus, use of conventional software applications inhibits how quickly settings such as access control settings of a storage system can be updated. In certain cases, time is of the essence. For example, integrity of a storage system may be at risk such as when a network manager cannot quickly change access rights associated with a security threat such as a recently turned-malicious user.

Because conventional network management applications provide limited support such as support for only a single vendor type of storage system, owners of the network may feel trapped into expanding a storage system to include storage system resources of a same vendor type even though an owner may otherwise prefer to expand a storage area network to include a heterogeneous mix of storage systems from multiple vendors to reduce cost. Thus, the burden of having to learn additional network management software applications may inhibit expansion of an initially small storage system to include storage system resources from multiple vendors. Furthermore, conventional network management applications fail to support user-friendly management display functions to manage entities that enhance a GUI's usefulness.

Embodiments of the invention significantly overcome the aforementioned and other deficiencies of conventional network management applications. In particular, embodiments of the invention include mechanisms and techniques for managing network resources via a display of a computer device. In one embodiment, the display enables a user to identify access rights associated with one or most host computers and the ability of the host computers to access corresponding storage system resources. The computer device illustrating the access rights may be, for example, a network management workstation including a network management software application (e.g., a resource manager) that presents, during runtime, a graphical user interface to a network manager. The network manager provides input to the graphical user interface to perform different management operations such as viewing and/or modifying access rights. Certain embodiments of the invention include network management software incorporating the functionality explained herein, as well as computerized devices configured to operate as explained herein.

More specifically, an embodiment of the invention includes a network manager that utilizes a network management software application (running on a network management computer station) to manage access control rights of users with respect to multiple types of vendor storage systems in a storage area network. Users of the multiple types of vendor storage systems typically are provided different access rights to corresponding network storage resources depending on access settings. The network manager utilizes the network management storage application to modify access rights of the users and, thus, the ability of the users to access multiple types of vendor specific storage system resources.

In one embodiment, the network manager modifies storage system access rights associated with one or more users by first viewing an access relationship of the one or more users with respect to one or more corresponding target storage systems. For example, the network management storage application generates a graphical user interface to the network manager. The graphical user interface includes a display region for the network manager to select specific host resources (e.g., host computer resource, client devices, etc.) of the storage area network.

The network management storage application generates a section of a display of the graphical user interface for the network manager to narrow a viewing of network resources associated with the selected one or more host resources. For example, the graphical user interface enables the network manager to provide a selection of a specific vendor type of storage system resource in the network.

Based on the selection of the specific vendor type of storage system resource, the graphical user interface displays one or multiple storage resources of the selected vendor type. The graphical user interface also includes a display region for the network manager to make a selection of a uniquely identified storage system resource of the selected vendor type, which may or may not be associated with the at least one selected host resource. Thus, based on selecting a particular storage system resource of a selected vendor type, a network manager may "drill down" or narrow a view of storage devices (e.g., logical volumes of storage) and corresponding one or more host resources having access to the storage devices.

The network management storage application optionally includes additional selectable parameters so that the network manager may further narrow and identify access relationships associated with the selected at least one host resource with respect to storage system resources. For example, the graphical user interface generated by the network management storage application may include a display region for the network manager to make a selection of storage ports associated with a selected storage system resource of a selected vendor type. Based on a selected one or more storage ports, the graphical user interface identifies which of the selected host resources in the network has access to the selected storage system resource.

The network management storage application further enables the network manager to display access control rights of the at least one host resource with respect to different vendor types of storage system resources. Additionally, the network management storage application and corresponding graphical user interface enables a network manager to modify access rights associated with the at least one host resource for a selected vendor type. For example, after identifying a target storage system resource associated with selected host resources, the network management storage application enables the network manager to selectively modify access rights of the selected host resources with respect to corresponding target storage system resources.

In one embodiment, the network management storage application generates vendor specific commands to modify access rights of the selected host resources depending on a vendor type of the selected storage system resource. For example, for a first selected storage system resource of a first vendor type, the network management storage application (when initiated by a network manager) generates a first set of vendor specific commands associated with the first vendor type to modify access rights associated with the first selected storage system resource. For a second selected storage system resource of a second vendor type, the network management storage application (when initiated by a network manager) generates a second set of vendor specific commands associated with the second vendor type to modify access rights associated with the second selected storage system resource. Thus, a common graphical user interface according to an embodiment of the invention enables a network manager to modify settings such as access control information for different vendor types of storage resources in a storage system.

More general embodiments of the invention include a technique of enabling a processing device to receive a selection of at least one host resource associated with a storage area network as selected by a network manager. In addition to receiving the selection of the at least one host resource, the processing device receives a selection of at least one storage parameter associated with the storage area network. The selection of the at least one storage parameter includes a selection of a vendor type associated with a storage system resource of the storage area network. Based on the selection information, the network management application correlates the selection of the at least one host resource with the selection of the vendor type to identify: i) storage devices of the storage system resource corresponding to the at least one storage parameter, and ii) access control rights of the at least one host resource with respect to the storage devices. Correlating the selection of the at least one host resource to a storage system resource of a selected vendor type (from multiple vendor types) enables a network manager to manage network resources in the storage area network via a single network management application rather than different software applications for each vendor type.

In further embodiments and potentially other independent embodiments of the invention, the processing device generates an output such as a graphical user interface to a display screen. In a first region on the display screen, the processing device displays a hierarchy of multiple icons representing corresponding host resources in the storage area network. The processing device enables a user to expand and/or contract a view of the hierarchy of multiple icons to facilitate the selection of the at least one host resource associated with the storage area network.

In relation to at least one of the multiple icons, the processing device maintains corresponding visual regions on the display to receive input commands from a user making the selection of the at least one host resource. Based on clicking in vicinity of a corresponding visual region based on use of a mouse, the processing device receives an input from a user identifying a selected one or more host resources from the hierarchy of multiple icons.

The processing device also generates a region of the display screen to receive an input provided by the network manager such as a signal identifying a selected vendor type. In response to receiving the selected vendor type, the processing device displays storage system resources associated with the selected vendor type.

In one embodiment, the processing device generating the graphical user interface provides a unique identifier associated with each of the displayed storage system resources of the selected vendor type. Additionally, the processing device enables a user to select a storage system resource of the selected vendor type based on the selection of the unique identifier. In one application, the unique identifier is a number associated with the storage system resource that appears in a display region generated by the graphical user interface. A network manager clicks on one of the unique identifiers to select a particular storage system resource.

In one embodiment, the graphical user interface includes a pull-down menu of functional options associated with the selected vendor type. The pull-down menu of functional options includes: i) a function to display physically connected storage system resources associated with the at least one host resource for the selected vendor type, ii) a function to display all storage devices in the network associated with the selected vendor type, and iii) a function to display physically unconnected storage systems resources associated with the at least one host resource for the selected vendor type. Thus, a user has wide flexibility in determining which target storage system resources and corresponding storage devices therein will be displayed for viewing.

As previously discussed, the processing device receives a signal identifying a particular user selected storage system resource of a particular vendor type. For the particular user selected storage system resource, the graphical user interface displays access ports associated with the selected storage system of the selected vendor type. The access ports identify communication ports through which host resources may access corresponding storage devices (e.g., logical storage segments) in the particular user selected storage system resource. In one application, the graphical user interface enables a user to modify a selection of the displayed access ports so that a network manager can identify which of the selected host resources is able to access or not access the particular user selected storage system resource through the selected access ports.

In one embodiment, the graphical user interface displays a related tree selection in a region of the display screen. The related tree selection indicates which, if any, of the selected at least one host resource has access rights to at least one corresponding storage device in the selected storage system resource. If a selected host resource has no access rights to any of the storage devices in the selected storage system resource, then the host resource will not be listed in the related tree selection of the graphical user interface. Thus, a network manager can utilize the information in the related tree selection to quickly determine whether a selected host resource has access to any storage devices associated with the selected storage system resource of the selected vendor type.

After receiving selection of a particular storage system resource of a selected vendor type as well as selection of access ports, the graphical user interface provides a display region of corresponding storage devices in the selected storage system resource that are accessible via the selected access ports.

In one embodiment, the display region includes a visual indication such as a table indicating whether any of the at least one host resource has access rights with respect to a corresponding storage device. For example, the graphical user interface provides an indication which, if any, of the host resources in the network has access rights to corresponding storage devices in the selected storage system resource.

To modify access rights, the network manager selects a particular storage device. The graphical user interface receives a signal indicating the selected at least one storage device and, in turn, generates a display (e.g., a new window) for the network manager to modify access rights associated with the selected at least one storage device. Thus, the network manager can select one or more storage devices and then modify access rights associated with selected host resources.

As discussed, techniques of the invention are well suited for use in applications in which a network manager manages a storage area network including multiple host resources and a corresponding storage system of heterogeneous storage system resources. However, it should be noted that embodiments of the invention are not limited to use in such applications and thus embodiments of the invention are well suited for other applications as well.

Other embodiments of the invention include a computerized device (e.g., a host computer, workstation, etc.) configured to support the aforementioned method operations disclosed herein as embodiments of the invention to provide a relationship view and associated resource management operations. In such embodiments, the computerized device includes a display, a memory system, a processor (e.g., a processing device) and an interconnect. The interconnect supports communications among the display, the processor and the memory system. The memory system is encoded with a resource management application that, when executed on the processor, produces a resource management process that includes a graphical user interface produced on the display of the computerized device. The graphical user interface allows the resource management process to perform all of the method embodiments and operations explained herein as embodiment of the invention.

Yet other embodiments of the invention disclosed herein include software programs to perform the method embodiment and operations summarized above and disclosed in detail below under the heading Detailed Description of Preferred Embodiments. More particularly, a computer program product (e.g., a computer-readable medium) including computer program logic encoded thereon may be executed on a computerized device to support generation and display of relationship views and associated operations as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of storage area network management servers, can also support embodiments of the invention.

One more particular embodiment of the invention is directed to a computer program product that includes a computer readable medium having instructions stored thereon for supporting management of network resources. The instructions, when carried out by a processor of the first data communication device, cause the processor to perform the steps of: i) receiving a selection of at least one host resource associated with a storage area network; ii) in addition to receiving the selection of the at least one host resource, receiving a selection of at least one storage parameter associated with the storage area network, the selection of the at least one storage parameter including selection of a vendor type associated with a storage system resource; and iii) correlating the selection of the at least one host resource with the selection of the at least one storage parameter to identify: a) storage devices of the storage system resource corresponding to the at least one storage parameter, and b) access control rights of the at least one host resource with respect to the storage devices. Other arrangements of embodiments of the invention that are disclosed herein include software programs to perform any of the method embodiment steps and operations summarized above and disclosed in detail below.

It should be understood that the system of the invention could be embodied as a software program or as a software program operating in conjunction with corresponding hardware. Example embodiments of the invention may be implemented within EMC's Control Center (ECC) software application that provides graphical management functionality for storage area network resources and in computerized devices that operate the Control Center (ECC) software. Control Center software is manufactured by EMC Corporation of Hopkinton, Mass., USA.

BRIEF DESCRIPTION OF THE DRAWINGS

The foregoing and other objects, features, and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

FIGS. 8A, 8B, and 8C combine to form a flowchart illustrating a more detailed technique for managing network resources according to an embodiment of the invention.

FIG. 11 is a screenshot of a display screen generated according to an embodiment of the invention.

DETAILED DESCRIPTION OF PREFERRED EMBODIMENTS

In one embodiment of the invention, a processing device such as a computer receives a selection of at least one host resource associated with a storage area network as selected by a network manager. In addition to receiving the selection of the at least one host resource, the processing device receives a selection of at least one storage parameter associated with the storage area network. The selection of the at least one storage parameter includes a selection of a vendor type of a storage system resource of the storage area network. Based on the selection information, the processing device correlates the selection of the at least one host resource with the selection of the vendor type to identify: i) storage devices of the storage system resource corresponding to the at least one storage parameter, and ii) access control rights of the at least one host resource with respect to the storage devices. Correlating the selection of the at least one host resource to a storage system resource of a selected vendor type (from multiple vendor types) enables a network manager to manage network resources in the storage area network via a single network management application rather than different network management software applications for each vendor type.

Figure 1:
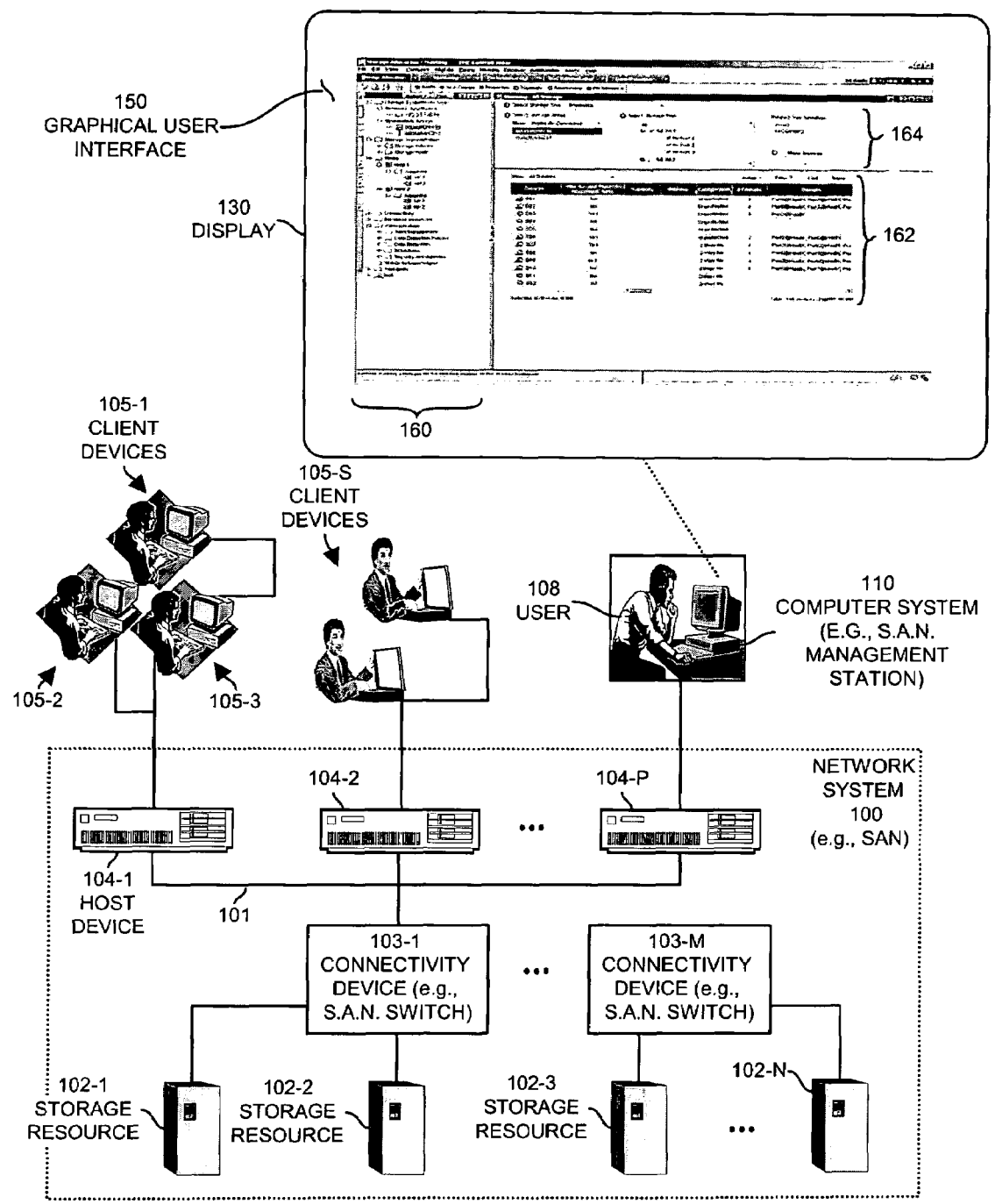
FIG. 1 is a block diagram of a storage area network and management station configured to operate according to an embodiment of the invention.

FIG. 1 illustrates a network system 100 (e.g., a storage area network) suitable for use in explaining an operation of example embodiments of the invention. As shown, the network system 100 includes a network medium 101 such as a high-speed data communications medium (e.g., Ethernet, optical network, or other type of network) that interconnects a plurality of components such as storage resources 102-1, 102-2, . . . 102-N, storage area network switches 103-1, . . . , 103-M, host devices (e.g., host servers) 104-1, 104-2, . . . , 104-P, client devices 105-1, 105-2, . . . , 105-S, and computer system 110 (e.g., a storage area network management station).

Computer system 110 is configured, in this example, as a storage area network management station operated by network manager or user 108 (e.g., a user responsible for managing the resources within the storage area network 100). Computer system 110 executes a resource manager application 120 (e.g., a software graphical user interface application more particularly shown in FIG. 2) that generates and displays information in accordance with embodiments of the invention as will be explained herein. The resource manager 120 in this example may be any type of network management software application that executes, performs or otherwise operates within the management station computerized system 110. It should be noted that computer system 110 may include certain other components such as one or more internal devices as well as software applications or processes that operate within or in conjunction with the illustrated components and devices in FIG. 1.

As shown towards the top of FIG. 1, and of particular interest to discussion of this invention, the management station computer system 110 is a computer device including corresponding display 130 (e.g., a monitor or other visual display device) generated by resource manager 120 operating to display a graphical user interface 150 as explained herein. User 108 provides input commands to control what information (e.g., tables, pop-up screens, etc.) is displayed on display 130.

The graphical user interface 150 configured in accordance with embodiments of the invention includes a hierarchical arrangement of icons 160 (e.g., a hierarchy of vertically disposed icons), parameter selection region 164, and display region 162, the latter of which includes configuration information associated with network system 100. Icons on display 130 represent managed hardware and software entities associated with network 100. Generally, and as will be explained in more detail shortly, the graphical user interface 150 enables a user 108 of the computer system 110 to select one or more icons (e.g. host resources) from the hierarchical arrangement of icons 160 displayed on the left side of display 130 and display configuration information.

Figure 2:
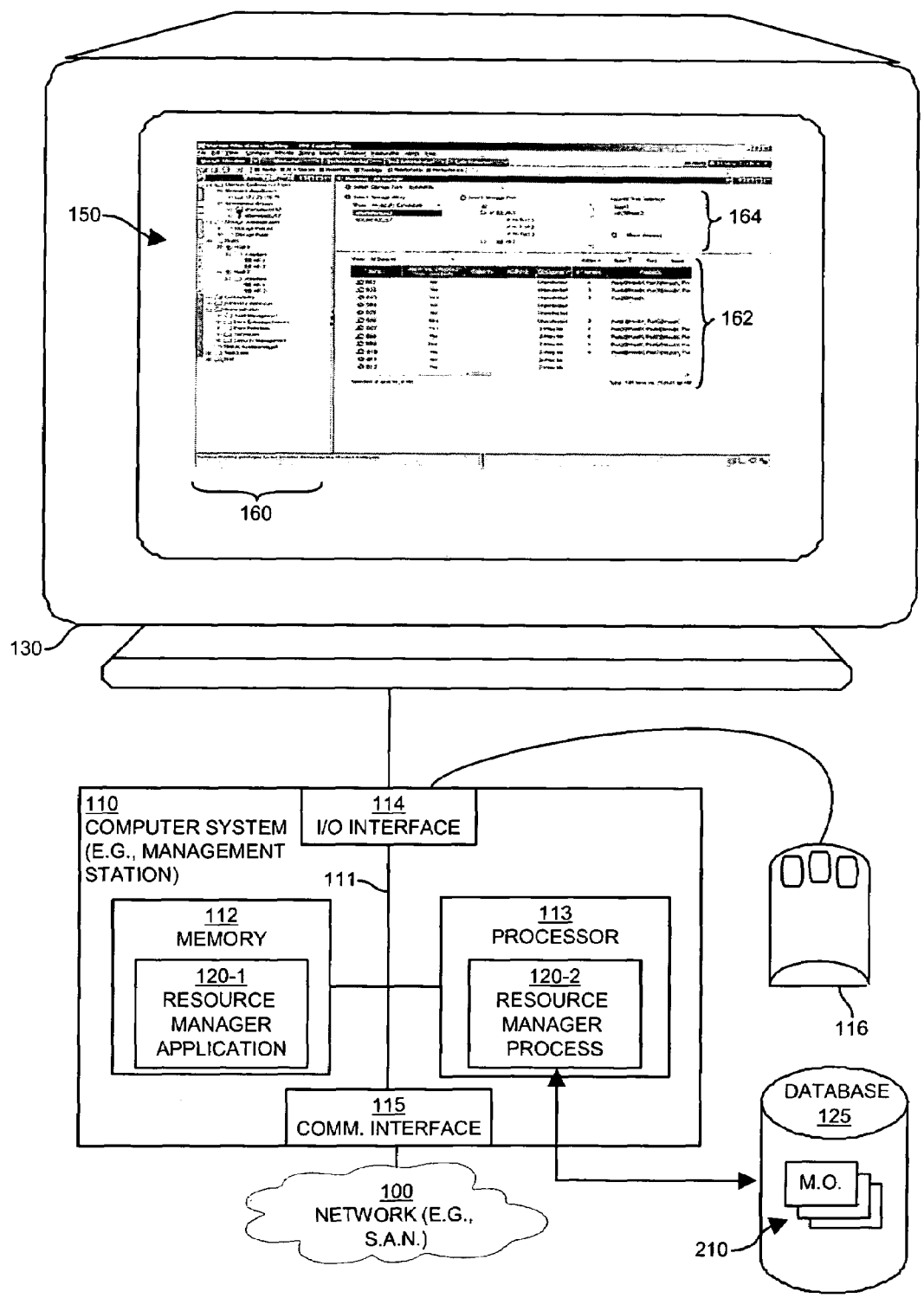
FIG. 2 is a block diagram of a suitable device for executing techniques according to an embodiment of the invention

FIG. 2 is a block diagram illustrating an example architecture of computer system 110 (e.g., a storage area network management station) according to embodiments of the invention. Computer system 110 may be a computerized device such as a personal computer, workstation, portable computing device, console, network terminal or the like. As shown, computer system 110 of the present example includes an interconnect 111 that couples a memory system 112, a processor 113, an input/output interface 114 and a communications interface 115. Peripheral device 116 (e.g., one or more viewer controlled devices such as a keyboard, mouse, etc.) couples to processor 113 through I/O interface 114 and enables user 108 to provide input commands and thus generally control display management functions associated with graphical user interface 150. Database 125 stores managed objects 210 associated with managed entities (e.g., hardware and software entities associated with host devices 104, storage resources 102, etc.) in network system 100. Communications interface 115 enables computer system 110 (and corresponding user 108) to communicate with other devices (i.e., resources) associated with network 100.

As shown, memory 112 is encoded with resource manager application 120-1 supporting generation, display, and implementation of functional operations of graphical user interface 150. Resource manager application 120-1 may be embodied as software code such as data and/or logic instructions (e.g., code stored in the memory or on another computer readable medium such as a disk) that supports processing functionality according to different embodiments of the invention as described herein. During operation, processor 113 accesses memory 112 via the interconnect 111 in order to launch, run, execute, interpret or otherwise perform the logic instructions of the resource manager application 120-1. Execution of resource manager application 120-1 produces processing functionality in resource manager process 120-2. In other words, the resource manager process 120-2 represents one or more portions of the resource manager application 120-1 (or the entire application 120-1) performing within or upon the processor 113 in the computerized device 110.

It should be noted that the resource manager 120 executed in computer system 110 is represented in FIG. 2 by either one or both of the resource manager application 120-1 and/or the resource manager process 120-2. For purposes of the discussion of the operation of embodiments of the invention, general reference will be made to the resource manager 120 as performing the various steps and functional operations to carry out the features of embodiments of the invention.

It should also be noted that embodiments of the invention include the resource manager application 120-1 itself (i.e., the un-executed or non-performing logic instructions and/or data). The resource manager application 120-1 may be stored on a computer readable medium such as a floppy disk, hard disk or in an optical medium. The resource manager application 120-1 may also be stored in a memory type system such as in firmware, read only memory (ROM), or, as in this example, as executable code within the memory system 112 (e.g., within Random Access Memory or RAM). In addition to these embodiments, it should also be noted that other embodiments of the invention include the execution of resource manager application 120-1 in processor 113 as the resource manager process 120-2. Thus, those skilled in the art will understand that the computer system 110 may include other processes and/or software and hardware components, such as an operating system that controls allocation and use of hardware resources.

Display 130 need not be coupled directly to computer system 100. For example, the resource manager 120 can be executed on a remotely accessible computerized device. In this instance, the graphical user interface 150 may be displayed locally to the user, while the resource manager process 120 is executed remotely.

To generate displayed information in graphical user interface 150, the host computer system 110 (e.g., the resource manager process 120-2) extracts information from managed objects 210 stored in database 125. For example, in one embodiment, the resource manager 120 receives an identity of at least one selected host resource associated with the storage area network. Based on the selected host resource, the resource manager 120 extracts information associated with the first managed object associated with the selected host resource as well as other managed objects from management database 125. Thereafter, resource manager 120 identifies at least one storage system resource associated with the selected host resource based on i) information in the first managed object, and ii) information in other corresponding managed objects 210 in the management database.

Graphical user interface 150 generated by resource manager 120 provides user 108 an ability to display access control rights of the at least one selected host resource with respect to different vendor types of storage system resources. For example, based on processing of retrieved information, the resource manager 120 identifies an access relationship between the selected host resource and storage devices associated with the storage system resources. Display 130 includes: i) a first region for the user to make the selection of the host resource, ii) a second region for the user to make a selection of at least one storage parameter, and iii) a third region for viewing the storage devices associated with the at least one host resource based on a user selected at least one storage parameter.

In one embodiment, computer system 100 extracts information from database 125 using SQL (Structured Query Language) and stores the information in data structures for processing. For example, database 125 contains managed objects 210 (e.g., database records, tables, data structures, etc.) associated with various hardware and software entities associated with network system 100. In one embodiment, database 125 includes managed objects 210 corresponding to host resources and storage resources in network system 100. More details regarding use of managed objects 210 will be discussed in connection with FIG. 3.

Figure 3:
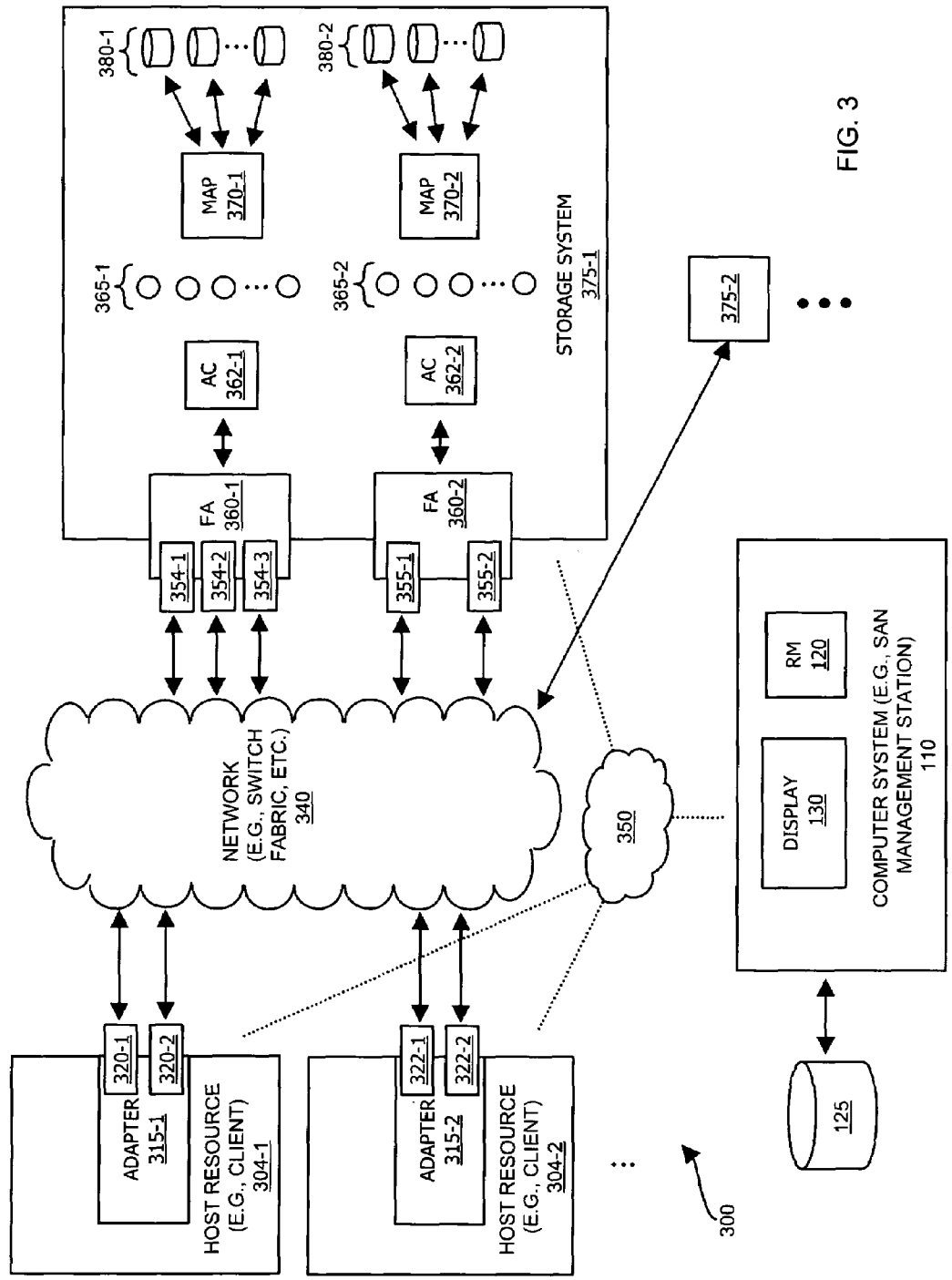
FIG. 3 is a block diagram illustrating a relationship between host resources and corresponding storage devices according to an embodiment of the invention.

FIG. 3 is a block diagram illustrating connectivity of resources in a storage area network 300 according to an embodiment of the invention. As shown, storage area network 300 includes host resource 304-1 and host resource 304-2 (collectively, host resources 304), network 340 (e.g., a high speed fiber based switch fabric), network 350, storage system resource 375-1, storage system resource 375-2, computer system 110, and database 125. Host resource 304-1 includes adapter 315-1 and corresponding port 320-1 and port 320-2 to communicate over network 340. Similarly, host resource 304-2 includes adapter 315-2 and corresponding port 322-1 and port 322-2 to communicate over network 340. Storage system resource 375-1 includes respective adapters 360-1 and 360-2, corresponding ports 354-1, 354-2, 354-3, 355-1 and 355-2, access controllers 362-1 and 362-2, storage devices 365-1 and 365-2, maps 370-1 and 370-2, as well as physical storage devices 380-1 and 380-2.

In general, storage area network 300 illustrates a network configuration in which host resources 304 (e.g., clients) access storage system 375. Note that storage area network 300 includes multiple storage systems 375 of different vendor types accessible by different host resources 304. For example, storage system 375-1 is manufactured by a first vendor type while storage system 375-2 is manufactured by a second vendor type, and so on.

Storage system resource 375-1 includes access controllers 362 that utilize configuration information to identify which resources 304 have access rights to corresponding storage devices 365. Host resources 304 may be configured to access storage system resources 375 along particular connection paths. For example, host resource 304-1 may be configured to communicate via adapter 315-1 (e.g., a host bus adapter) through port 320-1, network 340, and port 354-2 of adapter 360-1 (e.g., fiber channel adapter) to storage system resource 375-1. As its name suggests, access controller 362-1 in the connective path facilitates access to respective storage devices 365 depending on an access control configuration. That is, in this example, host resource 304 is limited to access certain storage devices in storage system resource 375-1 based on access configuration settings.

In one embodiment, storage devices 365 are configured as logical portions of one or more physical storage devices 380 (e.g., arrays of storage disks). Maps 370 provide a mapping of storage devices 365 (e.g., logical volumes) to corresponding physical storage devices 380.

As discussed, computer system 110 includes database 125 of managed objects 210. Database 125 tracks configuration information (e.g., access control settings) associated with storage area network 300 and, more particularly, access rights of host resources 304 with respect to storage system resources 375. In one embodiment, database 125 continuously receives up-to-date connectivity relationship and configuration settings associated with storage area network 300. For example, computer system 110 communicates over network 350 (e.g., LAN, WAN, etc.) to receive configuration information for storage in database 125. Sources providing the configuration information may include storage system resource 375, host resources 304, as well as other sources in storage area network 300. In one embodiment, agents at corresponding host resources 304 communicate with storage systems resources 375 that, in turn, communicate configuration information to resource manager for storage in database 125.

Figure 4:
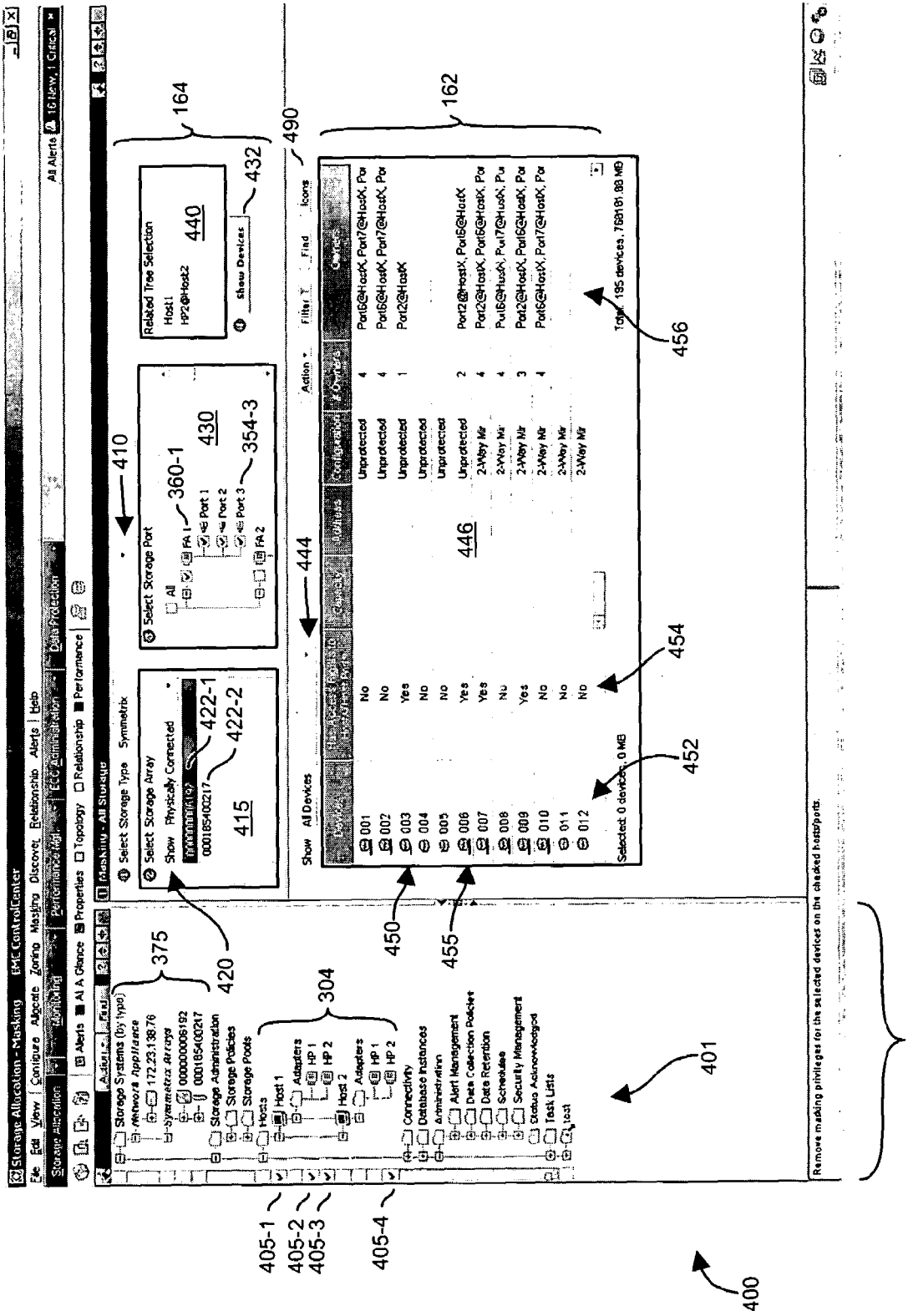
FIG. 4 is a screenshot of a graphical user interface according to an embodiment of the invention.

FIG. 4 is a screenshot 400 displayed on display 130 according to an embodiment of the invention. As shown, region 160 of screenshot 400 includes hierarchy of icons 401 representing managed objects (e.g., hardware and software resources) associated with storage area network 300. Display region 160 also includes display regions 405, which may be toggled (e.g., via user 108 clicking on them) to identify host resources and storage resources selected by user 108. Screenshot 400 also includes parameter selection region 164 enabling user 108 to select storage parameters associated with storage area network 300. In one embodiment, parameter selection region 164 includes vendor selection pull-down menu 410 for a user 108 to select a particular vendor type associated with a resource such as a storage system resource 375 in storage area network 300.

Display region 415 includes IDs or identification numbers 422 (that may be unique names such as text or numeric unique identifiers) associated with corresponding storage system resources 375 associated with selected host resources 405 (assuming "physically connected" has been selected in pull-down menu 420 as shown). Pull-down menu 420 enables a user 108 to view different sets of storage system resources 375 in display region 415. For example, selection of the "physically connected" entry in pull down menu 420 causes display region 415 to show all storage system resources 375 of a selected vendor type for those storage resources in which there is a physical connection with a selected host resource in visual region 405. Pull-down menu 420 includes a selectable option for showing all storage system resources 375 associated with storage area network 300 rather than just those physically connected to at least one selected host resource in visual region 405. Additionally, pull-down menu 420 includes a selectable option of "physically unconnected" for a user to display storage system resources 375 in display region 415 in which there is no physical connection with any of the selected host resources.

Display region 430 includes a list of adapters 360 (e.g., Fiber Adapters) associated with the selected identification number 422-1 in display region 415. Shading in display region 415 indicates which storage system resource identification number 422 of a selected vendor type has been selected.

Display region 430 supports functionality allowing user 108 to modify a default selection of all ports 354 and adapters 360 associated with a selected storage system resource identification number 422-1. Thus, user 108 can narrow or expand a number of storage devices 365 displayed in display region 162 by deselecting or selecting resources in display region 430.

After providing selection information in parameter selection region 164, the user 108 clicks on show devices icon 432. Clicking on icon 432 in parameter selection region 164 causes computer system 110 to display access configuration information in display region 162. Display region 440, above icon 432, includes a list of selected host resources 405 (e.g., including a check mark next to an entry) that are able to access at least one storage device 365 listed in table 446 of display region 162. Pull-down menu 444 enables user 108 to selectively filter which storage devices are shown in display region 162. As shown, user 108 has selected the "all devices" option.

As discussed, display region 162 includes table 446 to display access configuration information of host resources 304 with respect to storage devices 365. For example, column 452 includes a list of storage device icons 465 associated with selected storage system resource in display region 415. For each storage device icon 465 (corresponding to a storage device 365 in FIG. 3), information in column 454 identifies if any of the selected host resources 405 have corresponding access rights to storage devices 365 listed in column 452. Column 456 specifically identifies which host resources 304 have access to corresponding storage devices 365.

Thick line 455 in relation to a storage device icon 465 in column 452 identifies that more than one host resource has access rights to the corresponding storage device. Column 456 corroborates a number of owners as well as their IDs associated with the storage device icon 465. Thin line 450 in relation to a storage device icon 465 in column 452 identifies only one host resource has access rights to the corresponding storage device. Note that no line underscoring the device icons in column 452 indicates that no hosts have access rights to this device. Thus, the use of these non-textual symbols in relation to a storage device icon 465 convey information to user 108 about the corresponding storage devices 365 in storage area network 300.

Clicking on icon 490 changes a view associated with display region 162. For example, after user 108 clicks on icon 490, the display of storage devices 365 changes to a similar format as that shown in FIG. 5. User 108 may toggle between views in FIG. 4 and FIG. 5 by clicking on icon 490.

Figure 5:
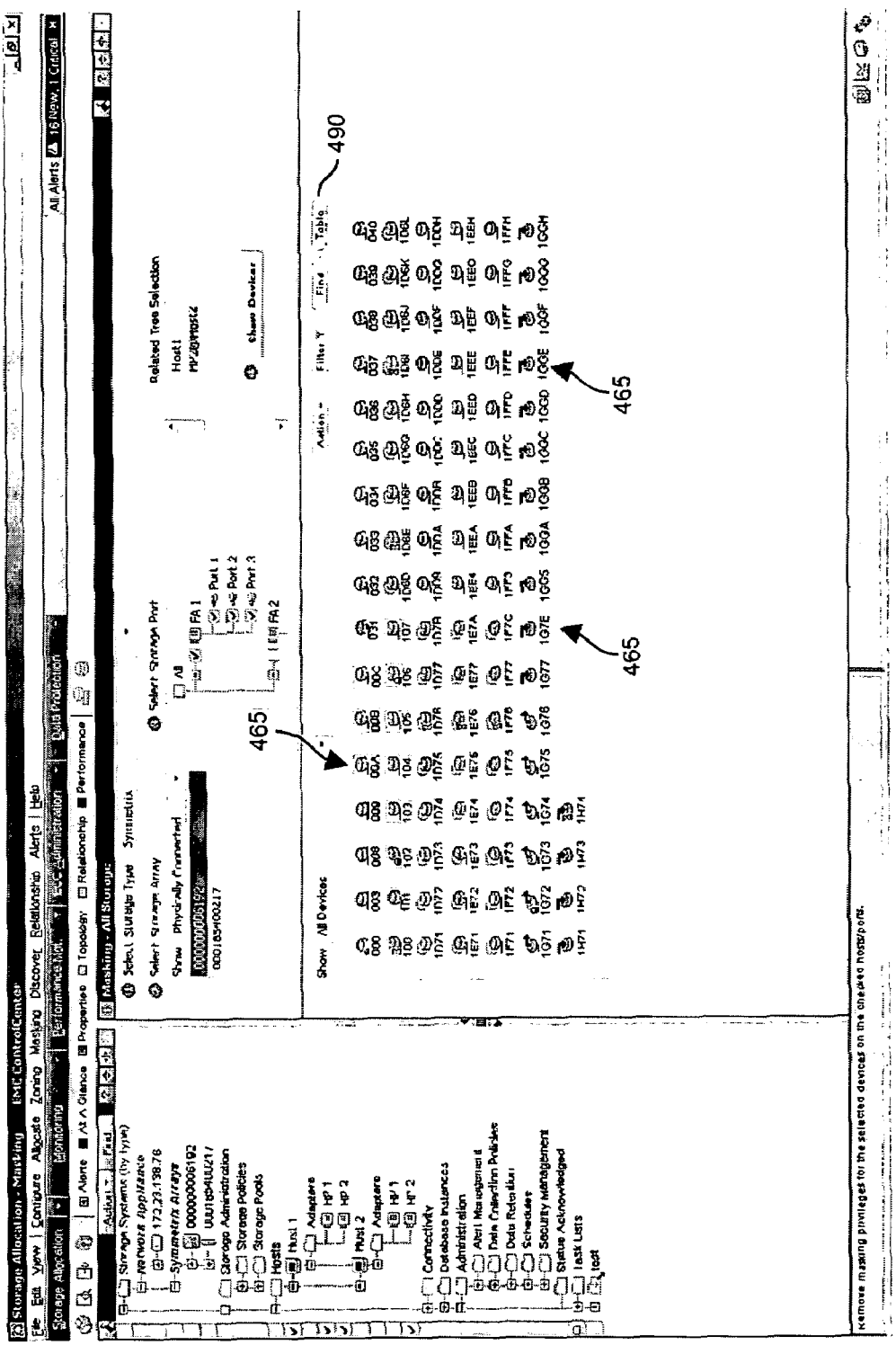
FIG. 5 is a screenshot of a graphical user interface according to an embodiment of the invention.

FIG. 5 is a screenshot 500 illustrating an alternative display of storage device icons according to an embodiment of the invention. As shown, storage device icons 465 include related symbols, shading, coloring, etc. to identify attributes associated with the corresponding storage device 365.

General functionality supported by computer system 110 according to embodiments of the invention will now be discussed with respect to flowchart 600 in FIG. 6 as briefly discussed above with respect to FIGS. 1 and 2.

Figure 6:
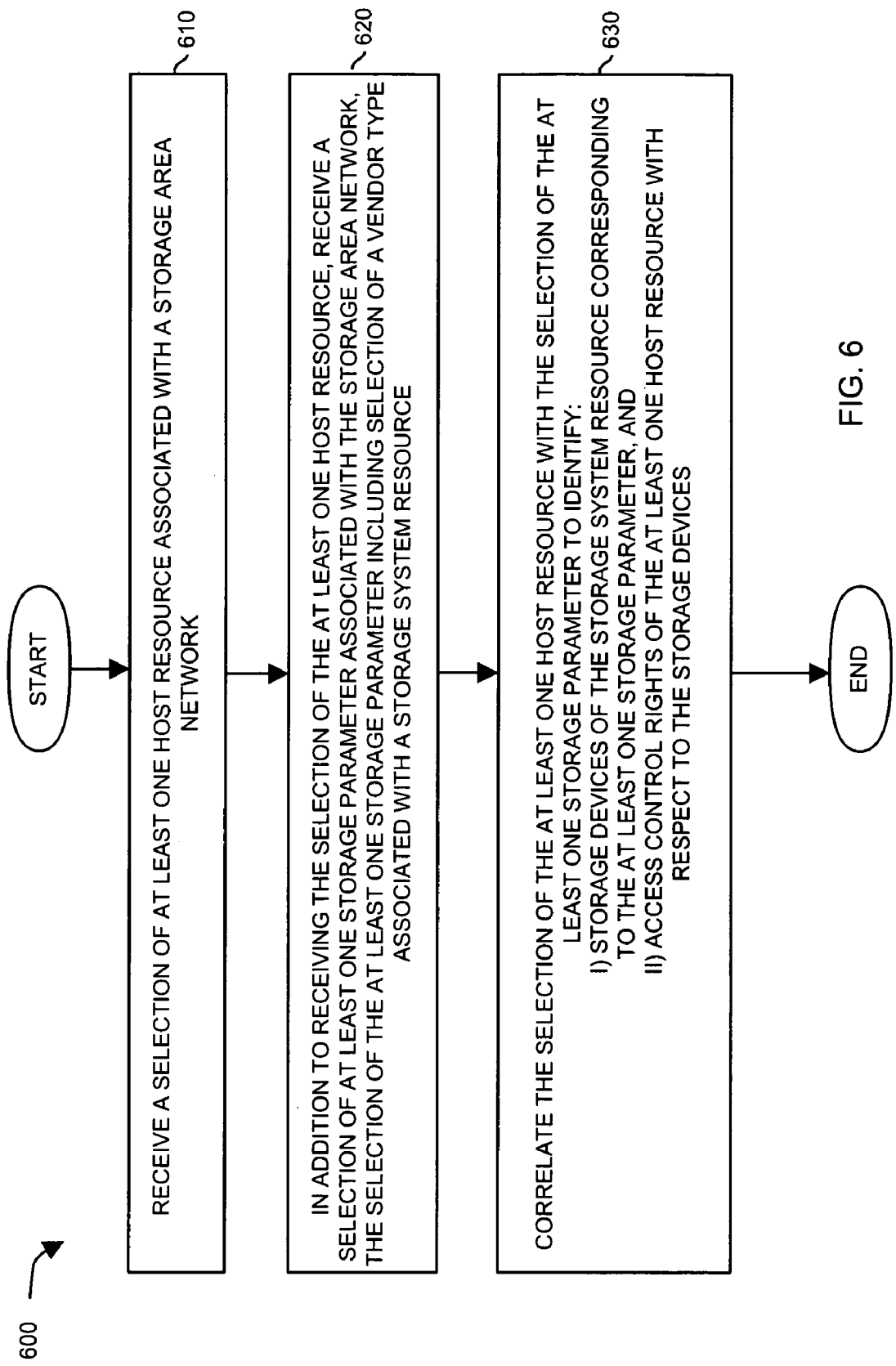
FIG. 6 is a flowchart illustrating general technique for managing network resources according to an embodiment of the invention.

FIG. 6 is a flowchart 600 of processing steps performed by resource manager 120 according to an embodiment of the invention. In general, flowchart 300 illustrates how resource manager 120 enables user 108 of the management station computer system 110 to display management views associated with selected managed entities of storage area network 300. Note that the discussion of FIG. 6 will include occasional references techniques and features discussed in the previous figures.

In step 610, resource manager 120 receives a selection of at least one host resource 304 associated with a storage area network 300 as selected by a user 108 such as a network manager. As mentioned, user 108 clicks on display region 405 to select one or more host resources 304.

In step 620, in addition to receiving the selection of the at least one host resource 304, the resource manager 120 receives a selection of at least one storage parameter associated with the storage area network 300. The selection of the at least one storage parameter includes a selection from user 108 of a vendor type associated with a storage system resource 375 of the storage area network 300.

In step 630, based on the selection information, the resource manager 120 correlates the selection of the at least one host resource 304 with the selection of the vendor type to identify: i) storage devices 365 of the storage system resource 375 corresponding to the at least one storage parameter, and ii) access control rights of the at least one host resource 304 with respect to the storage devices 365. Correlating the selection of the at least one host resource 304 to a storage system resource 375 of a selected vendor type (from multiple vendor types) enables a network manager such as user 108 to manage network resources in the storage area network 300 via a single network management application rather than a different application for each vendor type.

Figure 7:
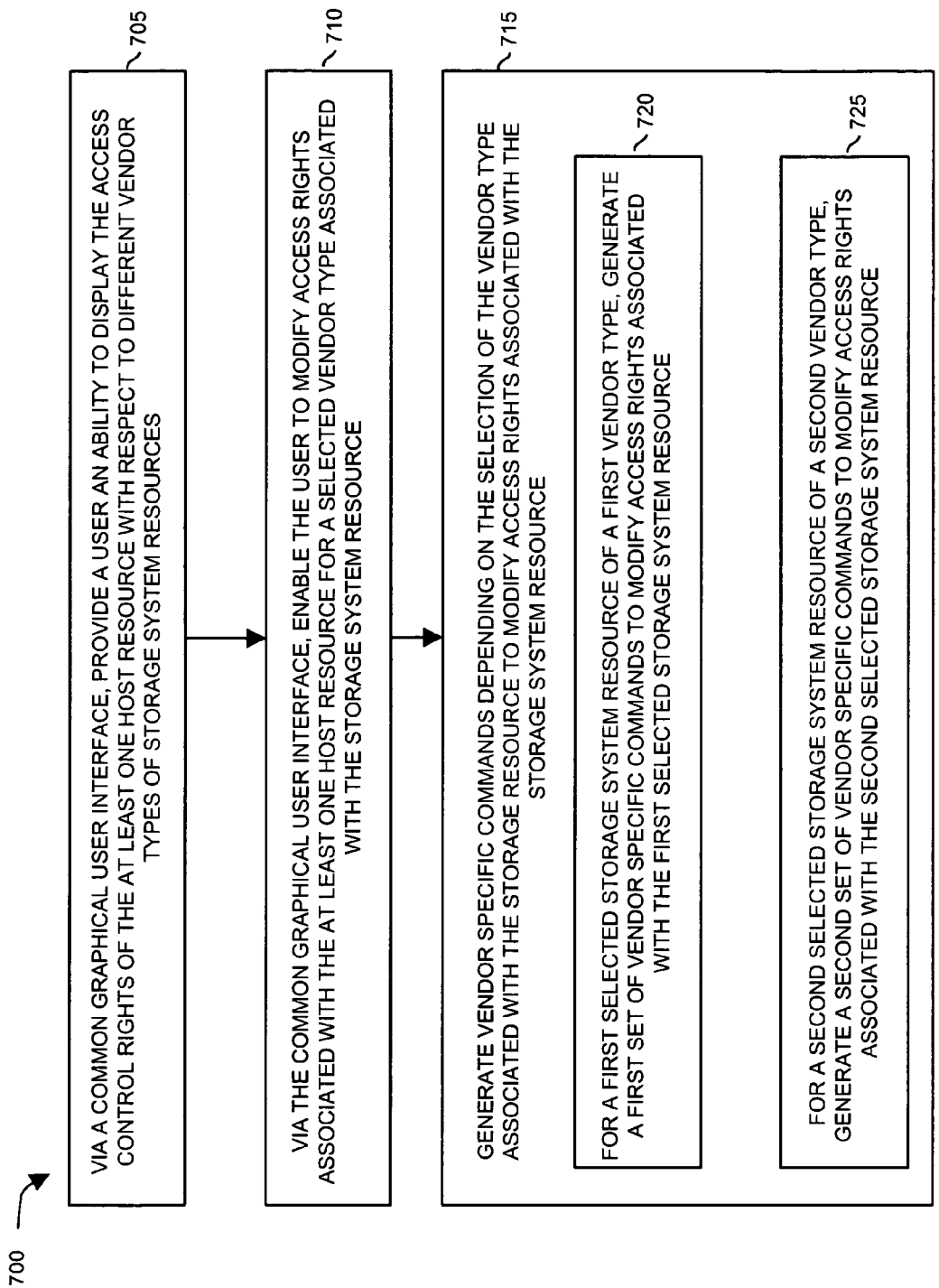
FIG. 7 is a flowchart illustrating a technique for managing network resources according to an embodiment of the invention.

FIG. 7 is a flowchart 700 of processing steps performed by resource manager 120 according to an embodiment of the invention.

In step 705, the resource manager 120 provides a user an ability to display access control rights of the selected one or more host resources with respect to different vendor types of storage system resources via use of a common graphical user interface 150 (e.g., via different screenshots).

In step 710, the resource manager 120 and corresponding graphical user interface 150 enables a user 108 to modify access rights associated with the at least one host resource 304 for a selected vendor type of storage system resource 375. For example, after identifying a target storage system resource 375 associated with the selected host resources 304, the resource manager 120 enables the network manager to selectively modify access rights of the selected host resources 304 with respect to corresponding target storage system resources 375.

In step 715, the resource manager 120 generates vendor specific commands to modify access rights of the selected host resources 304 depending on a vendor type of the selected storage system resource 375.

For example, in step 720, for a first selected storage system resource 375 of a first vendor type, the resource manager 120 (when initiated by a network manager) generates a first set of vendor specific commands associated with the first selected vendor type to modify access rights associated with the first selected storage system resource 375. Resource manager 120 transmits the generated vendor specific commands to the first selected storage system 375 to update the access right settings.

In step 725, for a second selected storage system resource 375 of a second vendor type, the resource manager 120 generates a second set of vendor specific commands associated with the second selected vendor type to modify access rights associated with the second selected storage system resource. Resource manager 120 transmits the generated vendor specific commands to the first selected storage system 375 to update the access right settings. Thus, a common graphical user interface 150 according to an embodiment of the invention generates commands for different types of vendor storage resources enabling a network manager to modify settings such as access control information for different vendor types of storage resources in a storage area network 300.

Figure 8A:
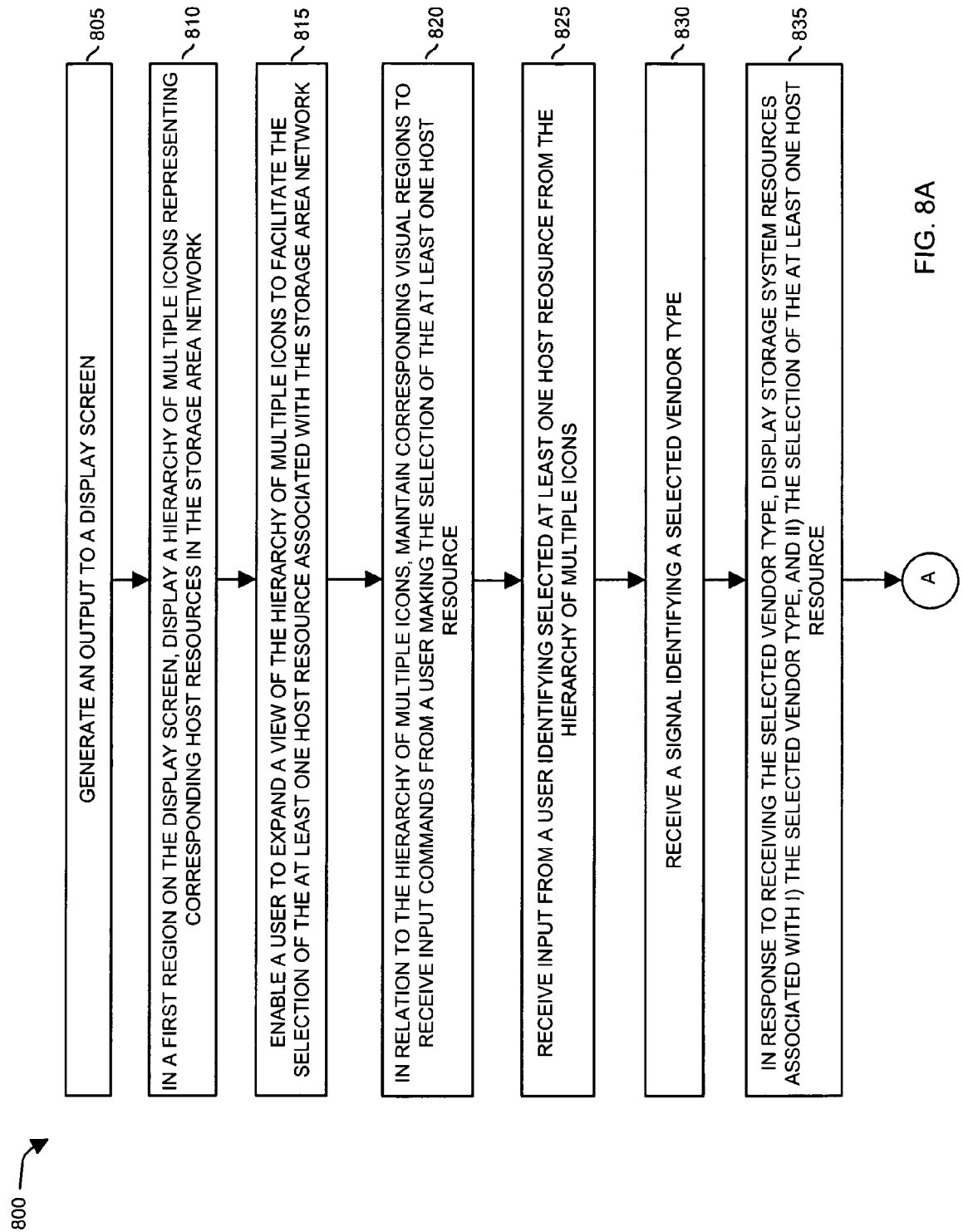

FIGS. 8A, 8B, and 8C combine to form flowchart 800 illustrating processing steps performed by resource manager 120 in accordance with a more specific example embodiment of the invention. As discussed, resource manager 120 enables user 108 of the management station computer system 110 to view and modify access rights associated with resources in storage area network 300. Note that flowchart 800 may overlap with respect to other flowcharts discussed herein. Also, note that the steps in any of the flowcharts need not be performed in the order shown.

In step 805, resource manager 120 (e.g., or processing device therein) generates an output such as a graphical user interface 150 to display 130.

In step 810, in a first region on the display 130, the resource manager 120 displays a hierarchy of multiple icons 401 representing corresponding host resources 304 in the storage area network 300.

In step 815, the resource manager 120 enables a user to expand and/or contract a view of the hierarchy of multiple icons 401 to facilitate the selection of the at least one host resource 304 associated with the storage area network 300.

In step 820, in relation to at least one of the multiple icons, the resource manager 120 maintains corresponding display regions 405 on the display 130 to receive input commands from a user 108 making the selection of the at least one host resource 304.

In step 825, based on clicking in vicinity of a corresponding display region 405 via use of a mouse, the resource manager 120 receives an input from a user 120 identifying a selected one or more host resources 304 from the hierarchy of multiple icons 401.

In step 830, the resource manager 120 generates a region of the display 130 (e.g., display region 415) to receive an input, initiated by the user 108, such as a signal identifying a selected vendor type.

In step 835, in response to receiving the selected vendor type, the resource manager 120 displays storage system resources 375 associated with the selected vendor type.

In step 840, the resource manager 120 generating the graphical user interface 150 provides a unique identifier 422 associated with each of the displayed storage system resources 375 of the selected vendor type.

In step 845, the resource manager 120 enables a user 108 to select a storage system resource 375 of the selected vendor type based on selection of a unique storage system resource identifier 422. In one application, the unique identifier 422 is a number associated with the storage system resource 375 that appears in display region 415 generated by the graphical user interface 150. As discussed, a user 108 clicks on one of the unique identifiers to select a particular storage system resource 375.

In step 850, graphical user interface 150 provides a pull-down menu 420 of functional options associated with the selected vendor type. The pull-down menu 420 of functional options includes: i) a function to display physically connected storage system resources 375 associated with the at least one host resource for the selected vendor type, ii) a function to display all storage system resources 375 associated with the selected vendor type, and iii) a function to display physically unconnected storage systems resources 375 associated with the at least one host resource for the selected vendor type. Thus, a user has wide flexibility in determining which target storage system resources 375 and corresponding storage devices 365 therein will be displayed for viewing on display 130.

In step 855, the resource manager 120 receives a signal identifying a particular user selected storage system resource 375 of a particular vendor type.

In step 860, for the particular user selected storage system resource, the graphical user interface 150 displays access ports 354 associated with the selected storage system 375 of the selected vendor type. The access ports identify communication ports through which host resources 304 may access corresponding storage devices 365 (e.g., logical storage segments) in the particular user selected storage system resource 375.

In step 865, the resource manager 120 via graphical user interface 150 enables a user 108 to modify a selection of the displayed adapters 360 and access ports 354 so that a user 108 can identify which of the selected host resources 304 is able to access or not access the particular user selected storage system resource 375 through the selected access ports 354.

In step 870, graphical user interface 150 displays a related tree selection in display region 440 on the display 130. As discussed, the related tree selection 440 indicates which, if any, of the selected at least one host resource 304 has access rights to at least one corresponding storage device 365 in the selected storage system resource 375. If a selected host resource 304 has no access rights to any of the storage devices 365 in the selected storage system resource 375, then the host resource 304 will not be listed in the related tree selection of the graphical user interface. Thus, a user 108 can utilize the information in the related tree selection to quickly determine whether a selected host resource has access to any storage devices associated with the selected storage system resource of the selected vendor type.

In step 875, after receiving selection of a particular storage system resource 375 of a selected vendor type as well as selection of access ports 354, the graphical user interface 150 generates table 446 including a display of corresponding storage devices 365 in the selected storage system resource 375 that are accessible via the selected access ports 354.

In step 880, resource manager 120 generates table 446 indicating which host resources 304 have access rights with respect to corresponding storage devices 365. For example, the graphical user interface 150 provides an indication which, if any, of the host resources in the network have access rights to corresponding storage devices 365 in the selected storage system resource as indicated by unique identifier 422-1.

In step 885, resource manager 120 receives a signal indicating a selection of a particular storage device icon 465 corresponding to a storage device 365.

In step 890, in response to the signal, the resource manager 120 generates a display for the user 108 to modify access rights associated with the selected at least one storage device. Thus, the user 108 can select one or more storage devices 365 and then modify access rights with respect to different host resources 304. In other words, the user may allow more or fewer host resources 304 to access a selected storage device 365.

Figure 9:
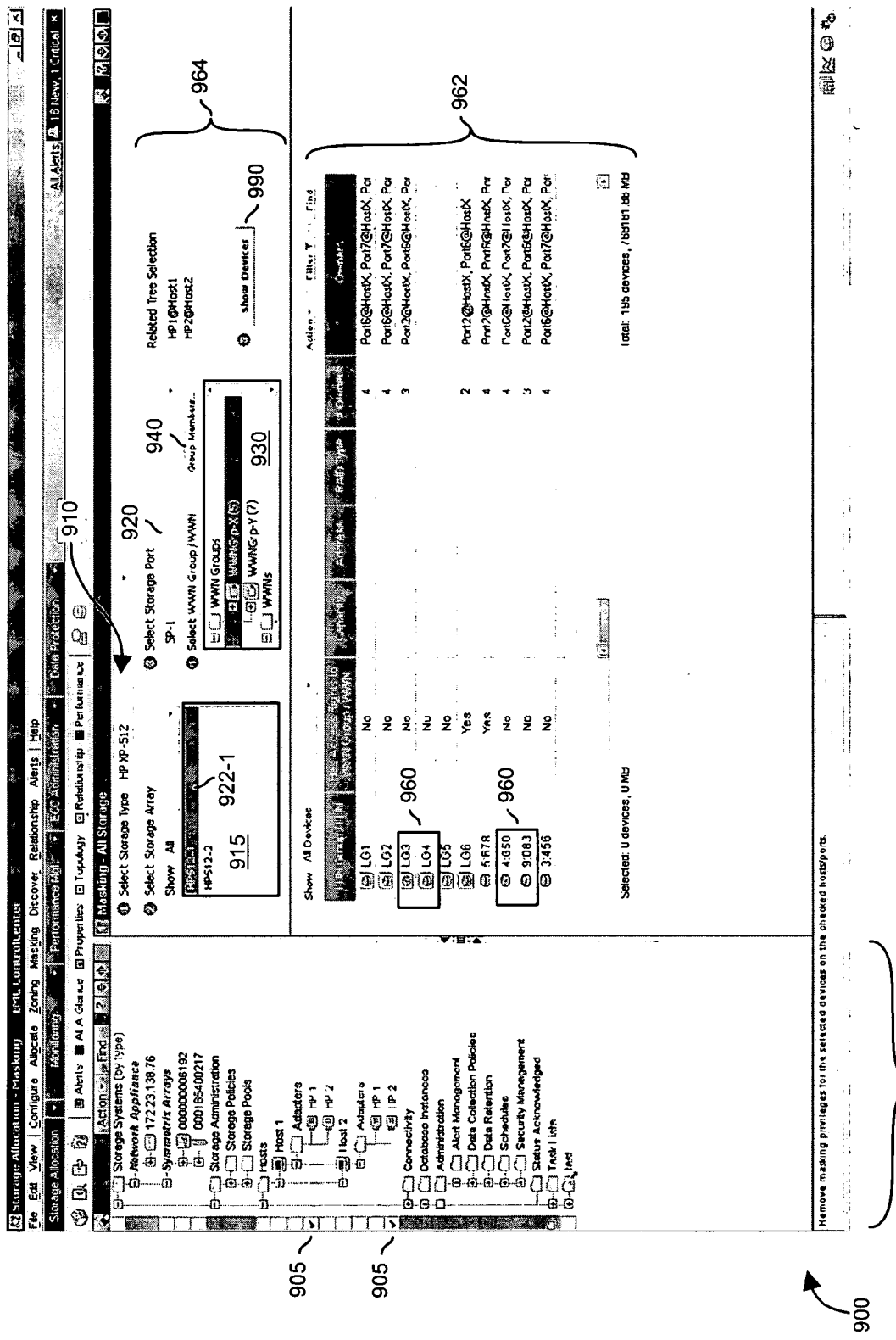
FIG. 9 is a screenshot of a display screen generated according to an embodiment of the invention.

FIG. 9 is a screenshot 900 generated by graphical user interface 150 according to an embodiment of the invention. In general, this embodiment of the invention illustrates different display graphics generated by graphical user interface 108 when a user selects a different vendor type of storage system resource such as a Hewlett Packard type storage system.

As shown, user 108 selects HP XP-512 via vendor selection pull-down menu 910. Thereafter, user 108 selects HP512-1 (i.e., storage system resource 922-1) in display region 915. Display region 920 displays storage ports associated with the selected storage system resource 922-1. Display region 930 illustrates the ability to select WWN groups. Clicking on icon 940 causes graphical user interface 150 to generate pop-up window 1110 in FIG. 11 illustrating members of the selected group in display region 930. Clicking on icon 990 produces graphics in display region 962 for viewing by user 108.

Figure 10:
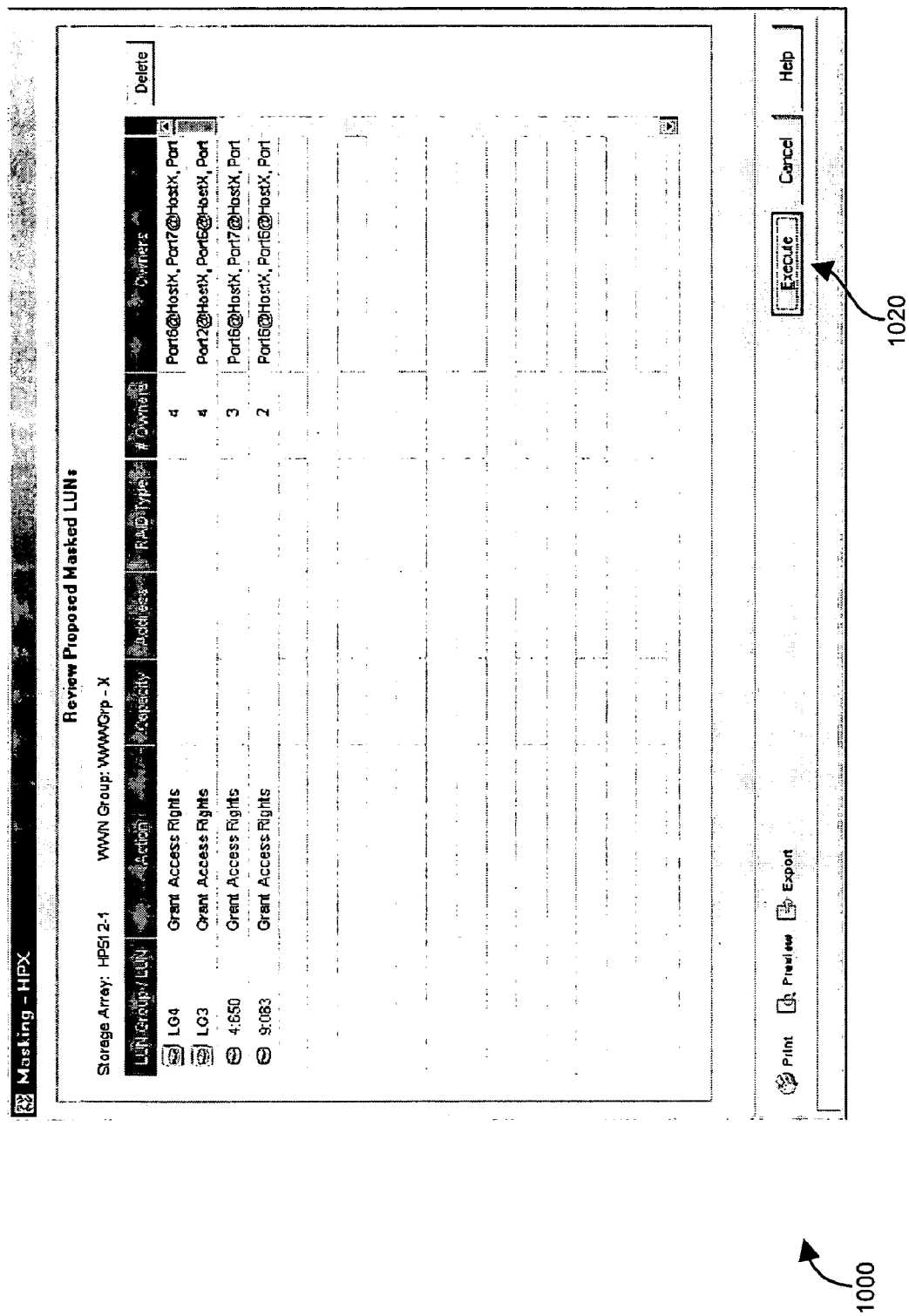
FIG. 10 is a screenshot of a display screen generated according to an embodiment of the invention.

Referring again to FIG. 9, to update or change access rights, user 108 selects icons 960 in display region 962. The icons become shaded or highlighted when selected by user 108. Thereafter, user 108 right clicks a corresponding mouse to select a function of adding access rights associated with the selected icons 960. Upon doing so, graphical user interface 150 generates screenshot 1000 in FIG. 10. In screenshot 1000 in FIG. 10, user 108 clicks on icon 1020 to grant selected host resources 905 (in FIG. 9) access rights to resources identified by icons 960 (e.g., LUN Group 3, LUN group 4, storage device 4:650, and storage device 9:083).

As discussed, techniques of the invention are well suited for use in applications in which a network manager manages a storage area network including multiple host resources and a corresponding storage system of heterogeneous storage system resources. However, it should be noted that embodiments of the invention are not limited to use in such applications and thus embodiments of the invention are well suited for other applications as well.

While this invention has been particularly shown and described with references to preferred embodiments thereof, it will be understood by those skilled in the art that various changes in form and details may be made therein without departing from the spirit and scope of the invention as defined by the appended claims. Such variations are intended to be covered by the scope of this invention. As such, the foregoing description of embodiments of the invention is not intended to be limiting. Rather, any limitations to embodiments of the invention are presented in the following claims.

What is claimed is:

1. A method for managing access rights of host resources with respect to corresponding storage systems, the method comprising:
   receiving a selection of at least one host resource associated with a storage area network;
   in addition to receiving the selection of the at least one host resource, receiving a selection of at least one storage parameter associated with the storage area network, the selection of the at least one storage parameter including selection of a vendor type associated with a storage system resource, the selection of the at least one parameter also including receiving a signal identifying a selected vendor type;
   correlating the selection of the at least one host resource with the selection of the at least one storage parameter to identify:
      i) storage devices of the at least one storage system resource corresponding to the at least one storage parameter, and
      ii) access control rights of the at least one host resource with respect to the storage devices;
   in response to receiving the selected vendor type, displaying storage system resources associated with the selected vendor type;
   providing a unique identifier associated with each of the displayed storage system resources;
   enabling a user to select a storage system resource of the selected vendor type; and
   based on a user selected storage system resource of the selected vendor type, providing a display of storage devices associated with the at least one host resource and the user selected storage system resource.

2. A method as in claim 1 further comprising:
   via a common and consistent graphical user interface, providing a user an ability to display the access control rights of the at least one host resource with respect to different vendor types of storage system resources.

3. A method as in claim 2 further comprising:
   via the common and consistent graphical user interface, enabling a user to modify access rights associated with the at least one host resource for a selected storage system resource of a selected vendor type.

4. A method as in claim 3 further comprising:
   generating vendor specific commands, depending on the selected storage system resource of the selected vendor type, to modify access rights associated with the storage devices in the selected storage system resource.

5. A method as in claim 2 further comprising:
   for a first selected storage system resource of a first vendor type, generating a first set of vendor specific commands to modify access rights associated with the first selected storage system resource; and
   for a second selected storage system resource of a second vendor type, generating a second set of vendor specific commands to modify access rights associated with the second selected storage system resource.

6. A method as in claim 1 further comprising:
   generating an output to a display screen;
   in a first region on the display screen, displaying multiple icons representing corresponding host resources in the storage area network; and
   in relation to at least one of the multiple icons, maintaining corresponding visual regions to receive input commands from a user making the selection of the at least one host resource.

7. A method as in claim 6, wherein displaying the multiple icons includes:
   displaying a hierarchy of multiple icons; and
   enabling a user to expand a view of the hierarchy of multiple icons to facilitate the selection of the at least one host resource associated with the storage area network.

8. A method as in claim 1 further comprising:
   providing a view of storage devices associated with the selection of the at least one storage parameter, the view including a visual indication whether any of the at least one host resource has access rights to a corresponding storage device.

9. A method as in claim 8 further comprising:
   providing an indication of which host resources have access rights to corresponding storage devices.

10. A method as in claim 1 further comprising:
    providing a pull-down menu of functional options associated with the selected vendor type, the pull-down menu of functional options including at least one of:
       i) display physically connected storage system resources associated with the at least one host resource for the selected vendor type;
       ii) display all storage devices associated with the selected vendor type; and
       iii) display physically unconnected storage devices associated with the at least one host resource for the selected vendor type.

11. A method as in claim 1 further comprising:
    displaying unique identifiers of storage system resources;
    receiving a signal identifying a user selected storage system resource; and
    for the user selected storage system resource, displaying access ports associated with accessing the storage devices.

12. A method as in claim 11 further comprising:
    enabling a user to modify a selection of at least one of the displayed access ports;
    receiving a modified selection of the displayed access ports; and
    displaying a list of storage devices depending on the modified selection of the displayed access ports.

13. A method as in claim 1 further comprising:
    displaying multiple storage device icons in a first region of a display screen, each storage device icon representing a corresponding storage device accessible by the at least one host resource; and
    displaying a related tree selection in a second region of the display screen, the related tree selection indicating which, if any, of the at least one host resource has access rights to the at least one storage device represented by the storage device icons displayed in the first region.

14. A method as in claim 1 further comprising:
    receiving a signal indicating a selected at least one storage device; and providing a display for a network manager to modify access rights associated with a selected at least one host resource for accessing the selected at least one storage device.

15. A method as in claim 1 further comprising:
selectively providing symbols near storage device icons associated with the storage devices, the symbols identifying a number of host resources able to access a corresponding storage device.

16. A method as in claim 1 further comprising:
displaying a list of storage devices associated with a selection of a particular storage system of a selected vendor type; and
enabling a user to toggle a display view of the storage devices between a table view and an icon view, the table view including a listing of selectable storage device icons as well as corresponding access control information, the icon view including a presentation of selectable storage device icons with visual indication of access rights.

17. A method as in claim 1, wherein receiving the selection of the at least one storage parameter includes at least one of the following:
i) receiving a selection of a vendor type of storage system resource;
ii) receiving a selection of a uniquely identified storage system resource of a selected vendor type in step i; and
iii) receiving a selection of storage ports through host resources access the storage devices of the uniquely identified storage system resource of the selected vendor type.

18. A method as in claim 1 further comprising:
generating an output for a display screen to display an access relationship to a user, the display screen including:
i) a first region for the user to make the selection of the at least one host resource,
ii) a second region for the user to make a selection of the at least one storage parameter, and
iii) a third region for viewing the storage devices associated with the at least one storage parameter.

19. A method as in claim 18, wherein receiving the selection of the at least one storage parameter includes:
i) receiving a selection of a vendor type of storage system resource;
ii) receiving a selection of a uniquely identified storage system resource of a selected vendor type in step i; and
iii) receiving a selection of storage ports through host resources access the storage devices of the uniquely identified storage system resource of the selected vendor type.

20. A method as in claim 18, wherein generating the output for the display screen includes:
locating the first region on a left side of the display screen;
locating the second region on an upper right portion of the display screen; and
locating the third region on a bottom right portion of the display screen.

21. A method for displaying access rights of host resources with respect to corresponding storage system resources in a storage area network, the method comprising:
receiving an identity of at least one selected host resource associated with the storage area network;
retrieving a first managed object from a management database that corresponds to the at least one selected host resource;
identifying at least one storage system resource associated with the at least one selected host resource based on i) information in the first managed object, and ii) information in other corresponding managed objects in the management database;
providing a user an ability to display access control rights of the at least one selected host resource with respect to different vendor types of storage system resources;
extracting information from the first managed object corresponding to the at least one selected host resource;
extracting information from other managed objects associated with managed entities in the storage area network;
storing the information extracted from the first managed object and the other managed objects in corresponding data structures;
based on processing of information in the data structures, identifying an access relationship between the at least one selected host resource and storage devices associated with the storage system resources;
generating an output for a display screen to display the access relationship to a user, the display screen including:
i) a first region for the user to make the selection of the at least one host resource,
ii) a second region for the user to make a selection of at least one storage parameter, and
iii) a third region for viewing the storage devices associated with the at least one host resource based on a user selected at least one storage parameter;
receiving a user generated selection of the at least one storage Parameter in the second region, the user generated selection including:
i) receiving a selection of a vendor type of storage system resource;
ii) receiving a selection of a uniquely identified storage system resource of a selected vendor type in step i; and
iii) receiving a selection of storage ports through which host resources access the storage devices of the uniquely identified storage system resource of the selected vendor type.

22. A computer system for managing access rights of host resources with respect to corresponding storage system resources, the computer system comprising:
a processor;
a memory unit that stores instructions associated with an application executed by the processor;
a communication interface that supports communication with other nodes of the storage area network; and
an interconnect coupling the processor, the memory unit, and the communication interface, enabling the computer system to execute the application and perform operations of:
receiving a selection of at least one host resource associated with a storage area network;
in addition to receiving the selection of the at least one host resource, receiving a selection of at least one storage parameter associated with the storage area network, the selection of the at least one storage parameter including selection of a vendor type associated with a storage system resource, the selection of the at least one parameter also including receiving a signal identifying a selected vendor type;
correlating the selection of the at least one host resource with the selection of the at least one storage parameter to identify:

i) storage devices of the storage system resource corresponding to the at least one storage parameter, and
ii) access control rights of the at least one host resource with respect to the storage devices;

in response to receiving the selected vendor type, displaying storage system resources associated with the selected vendor type;

providing a unique identifier associated with each of the displayed storage system resources;

enabling a user to select a storage system resource of the selected vendor type; and based on a user selected storage system resource of the selected vendor type, providing a display of storage devices associated with the at least one host resource and the user selected storage system resource.

23. A computer system as in claim 22 that additionally performs an operation of:
via a common graphical user interface, providing a user an ability to display the access control rights of the at least one host resource with respect to different vendor types of storage system resources.

24. A computer system as in claim 23 that additionally performs an operation of:
via the common graphical user interface, enabling a user to modify access rights associated with the at least one host resource for a selected storage system resource of a selected vendor type.

25. A computer system as in claim 24 that additionally performs an operation of:
generating vendor specific commands, depending on the selected storage system resource of the selected vendor type, to modify access rights associated with the storage devices in the selected storage system resource.

26. A computer system as in claim 23 that additionally performs operations of:
for a first selected storage system resource of a first vendor type, generating a first set of vendor specific commands to modify access rights associated with the first selected storage system resource; and
for a second selected storage system resource of a second vendor type, generating a second set of vendor specific commands to modify access rights associated with the second selected storage system resource.

27. A computer system as in claim 22 that additionally performs operations of:
generating an output to a display screen;
in a first region on the display screen, displaying multiple icons representing corresponding host resources in the storage area network; and
in relation to at least one of the multiple icons, maintaining corresponding visual regions to receive input commands from a user making the selection of the at least one host resource.

28. A computer system as in claim 27, wherein displaying the multiple icons includes:
displaying a hierarchy of multiple icons; and
enabling a user to expand a view of the hierarchy of multiple icons to facilitate the selection of the at least one host resource associated with the storage area network.

29. A computer system as in claim 22 that additionally performs an operation of:
providing a view of storage devices associated with the selection of the at least one storage parameter, the view including a visual indication whether any of the at least one host resource has access rights to a corresponding storage device.

30. A computer system as in claim 29 that additionally performs an operation of:
providing an indication which host resources have access rights to corresponding storage devices.

31. A computer system as in claim 22 that additionally performs operations of:
providing a pull-down menu of functional options associated with the selected vendor type, the pull-down menu of functional options including at least one of:
i) display physically connected storage system resources associated with the at least one host resource for the selected vendor type;
ii) display all storage devices associated with the selected vendor type; and
iii) display physically unconnected storage devices associated with the at least one host resource for the selected vendor type.

32. A computer system as in claim 22 that additionally performs operations of:
displaying unique identifiers of storage system resources;
receiving a signal identifying a user selected storage system resource; and
for the user selected storage system resource, displaying access ports associated with accessing the storage devices.

33. A computer system as in claim 32 that additionally performs operations of:
enabling a user to modify a selection of at least one of the displayed access ports;
receiving a modified selection of the displayed access ports; and
displaying a list of storage devices depending on the modified selection of the displayed access ports.

34. A computer system as in claim 22 that additionally performs operations of:
displaying multiple storage device icons in a first region of a display screen, each storage device icon representing a corresponding storage device accessible by the at least one host resource; and
displaying a related tree selection in a second region of the display screen, the related tree selection indicating which, if any, of the at least one host resource has access rights to the at least one storage device represented by the storage device icons displayed in the first region.

35. A computer system as in claim 22 that additionally performs operations of:
receiving a signal indicating a selected at least one storage device; and
providing a display for a network manager to modify access rights associated with a selected at least one host resource for accessing the selected at least one storage device.

36. A computer system as in claim 22 that additionally performs an operation of:
selectively providing symbols near storage device icons associated with the storage devices, the symbols identifying a number of host resources able to access a corresponding storage device.

37. A computer system as in claim 22 that additionally performs operations of:
displaying a list of storage devices associated with a selection of a particular storage system of a selected vendor type; and
enabling a user to toggle a display view of the storage devices between a table view and an icon view, the table view including a listing of selectable storage device icons as well as corresponding access control information, the icon view including a presentation of selectable storage device icons.

38. A computer system as in claim 22, wherein receiving the selection of the at least one storage parameter includes at least one of the following:
   i) receiving a selection of a vendor type of storage system resource;
   ii) receiving a selection of a uniquely identified storage system resource of a selected vendor type in step i; and
   iii) receiving a selection of storage ports through host resources access the storage devices of the uniquely identified storage system resource of the selected vendor type.

39. A computer system as in claim 22 that additionally performs operations of:
   generating an output for a display screen to display an access relationship to a user, the display screen including:
      i) a first region for the user to make the selection of the at least one host resource,
      ii) a second region for the user to make a selection of the at least one storage parameter, and
      iii) a third region for viewing the storage devices associated with the at least one storage parameter.

40. A computer system as in claim 39, wherein receiving the selection of the at least one storage parameter includes:
   i) receiving a selection of a vendor type of storage system resource;
   ii) receiving a selection of a uniquely identified storage system resource of a selected vendor type in step i; and
   iii) receiving a selection of storage ports through host resources access the storage devices of the uniquely identified storage system resource of the selected vendor type.

41. A computer system as in claim 39, wherein generating the output for the display screen includes:
   locating the first region on a left side of the display screen;
   locating the second region on an upper right portion of the display screen; and
   locating the third region on a bottom right portion of the display screen.

42. A computer program product including a computer-readable medium having instructions stored thereon for processing data information, such that the instructions, when carried out by a processing device, enable the processing device to perform the steps of:
   receiving a selection of at least one host resource associated with a storage area network;
   in addition to receiving the selection of the at least one host resource, receiving a selection of at least one storage parameter associated with the storage area network, the selection of the at least one storage parameter including selection of a vendor type associated with a storage system resource, the selection of the at least one parameter also including receiving a signal identifying a selected vendor type;
   correlating the selection of the at least one host resource with the selection of the at least one storage parameter to identify:
      i) storage devices of the at least one storage system resource corresponding to the at least one storage parameter, and
      ii) access control rights of the at least one host resource with respect to the storage devices;
   in response to receiving the selected vendor type, displaying storage system resources associated with the selected vendor type;
   providing a unique identifier associated with each of the displayed storage system resources;
   enabling a user to select a storage system resource of the selected vendor type; and
   based on a user selected storage system resource of the selected vendor type, providing a display of storage devices associated with the at least one host resource and the user selected storage system resource.

43. A computer system associated with a storage area network, the computer system including:
   means for receiving a selection of at least one host resource associated with a storage area network;
   in addition to means for receiving the selection of the at least one host resource, means for receiving a selection of at least one storage parameter associated with the storage area network, the selection of the at least one storage parameter including selection of a vendor type associated with a storage system resource, the selection of the at least one parameter also including means for receiving a signal identifying a selected vendor type;
   means for correlating the selection of the at least one host resource with the selection of the at least one storage parameter to identify:
      i) storage devices of the at least one storage system resource corresponding to the at least one storage parameter, and
      ii) access control rights of the at least one host resource with respect to the storage devices;
   in response to receiving the selected vendor type, means for displaying storage system resources associated with the selected vendor type;
   means for providing a unique identifier associated with each of the displayed storage system resources;
   means for enabling a user to select a storage system resource of the selected vendor type; and
   based on a user selected storage system resource of the selected vendor type, means for providing a display of storage devices associated with the at least one host resource and the user selected storage system resource.

* * * * *